(12) United States Patent
Onoyama

(10) Patent No.: US 11,234,511 B2
(45) Date of Patent: Feb. 1, 2022

(54) VEHICLE

(71) Applicant: HONDA MOTOR CO., LTD., Tokyo (JP)

(72) Inventor: Mayumi Onoyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 16/509,587

(22) Filed: Jul. 12, 2019

(65) Prior Publication Data

US 2020/0037757 A1 Feb. 6, 2020

(30) Foreign Application Priority Data

Aug. 6, 2018 (JP) .............................. JP2018-147504

(51) Int. Cl.
*A47B 31/06* (2006.01)
*B60N 2/005* (2006.01)

(52) U.S. Cl.
CPC .............. *A47B 31/06* (2013.01); *B60N 2/005* (2013.01)

(58) Field of Classification Search
CPC .......... B60N 3/001; B60N 2/14; B60N 2/005; B60R 21/20; A47B 31/06
USPC ..................................................... 280/730.1
See application file for complete search history.

(56) References Cited

U.S. PATENT DOCUMENTS

| | | | |
|---|---|---|---|
| 2008/0271645 A1* | 11/2008 | Swailes | A47B 31/06 108/44 |
| 2009/0058152 A1 | 3/2009 | Orlo et al. | |
| 2017/0259772 A1* | 9/2017 | Farooq | B60R 21/0136 |
| 2018/0099705 A1* | 4/2018 | Faruque | B62D 31/00 |
| 2019/0111877 A1* | 4/2019 | Line | B60R 21/233 |
| 2019/0126783 A1* | 5/2019 | Baccouche | B60N 2/0292 |

FOREIGN PATENT DOCUMENTS

| | | |
|---|---|---|
| CN | 201349732 Y | 11/2009 |
| CN | 104691386 A | 6/2015 |
| CN | 205072460 U | 3/2016 |
| CN | 105667363 A | 6/2016 |
| CN | 107886854 A | 4/2018 |
| JP | 2017039400 A | 2/2017 |

OTHER PUBLICATIONS

First Notification of Office Action for Patent Application CN 201910706378.6 dated Jul. 14, 2021; 16 pp.

* cited by examiner

*Primary Examiner* — James A Shriver, II
*Assistant Examiner* — Hilary L Johns
(74) *Attorney, Agent, or Firm* — Armstrong Teasdale LLP

(57) ABSTRACT

A vehicle includes: a table liftably provided at a center of a floor of a cabin of the vehicle; and multiple seats arranged around the table such that each seat faces the table. Preferably, the table is configured to be lifted up and down between a stowed position in which at least a part of the table is stowed in the floor and a deployed position in which the table protrudes more upward than in the stowed position.

10 Claims, 8 Drawing Sheets

VEHICLE

TECHNICAL FIELD

The present invention relates to a vehicle, and in particular to a vehicle with a novel seat arrangement.

BACKGROUND ART

In an autonomous vehicle, the driver is not required to be facing forward at all times, and therefore, the front seat may be selectively turned rearward so as to face the rear seat. See JP2017-039400A, for instance. Thus, the introduction of autonomous vehicles has created new possibilities for seat arrangement.

Also, ride share is receiving a growing attention from the view point of reducing traffic congestion and $CO_2$ emission. In a ride share, groups of people sharing common destinations share common vehicles. Oftentimes, people sharing a ride may be strangers to one another. Therefore, some consideration may be desired in seating the people sharing the ride so as to maximize privacy and minimize stress. On the other hand, people sharing the ride may know one another. In such a case, it may be desired that the passengers are seated so as to facilitate mutual conversation.

SUMMARY OF THE INVENTION

In view of such a problem of the prior art, a primary object of the present invention is to provide a vehicle that can provide a comfortable space for a wide range of passengers.

To achieve such an object, one embodiment of the present invention provides vehicle (1), comprising: a table (30) liftably provided at a center of a floor (6) of a cabin (5) of the vehicle; and multiple seats (41, 42, 50) arranged around the table such that each seat faces the table.

According to this configuration, the passengers seated on the seats face opposing passengers via the table, and therefore, an appropriate distance can be maintained between the passengers. Thereby, it is possible to secure privacy of each passenger and reduce stress even when the passengers are strangers to one another. Thus, the vehicle having the above configuration can provide a comfortable space for a wide range of passengers.

In the above configuration, preferably, the table is configured to be lifted up and down between a stowed position in which at least a part of the table is stowed in the floor and a deployed position in which the table protrudes more upward than in the stowed position.

According to this configuration, when the table is placed in the stowed position, a moving space for the passengers can be formed in the middle of the cabin. Thereby, the passengers are allowed to get in or out of the vehicle easily.

In the above configuration, preferably, an upper surface of the table in the stowed position is positioned at a same height as an upper surface of the floor.

According to this configuration, when the table is in the stowed position, there is no step created between the table and the floor. This contributes to allowing the passengers to get in or out of the vehicle easily.

In the above configuration, preferably, the vehicle further comprises an object (36) liftably mounted to an upper part of the table.

According to this configuration, the object when protruding upward from table can block the line of sight of the passengers seated to face each other across the table. Thus, the object can contribute to securing privacy of each passenger and reducing stress of each passenger.

In the above configuration, preferably, the vehicle further comprises an airbag device (60) provided in the object (36), the airbag device including an airbag (61) configured to be deployed toward all of the seats.

According to this configuration, in the event of a vehicle crash, contact between the passengers as well as between each passenger and the table (or object) can be prevented.

In the above configuration, preferably, the vehicle further comprises at least one airbag device (60) provided in the table, the at least one airbag device including at least one airbag (61).

According to this configuration, in the event of a vehicle crash, contact between the passengers as well as between each passenger and the table can be prevented.

In the above configuration, preferably, the at least one airbag device consists of a single airbag device (60) having a single airbag (61) configured to be deployed upward and toward all of the seats from a center of the table.

According to this configuration, it is possible to reduce the number of airbags to simplify the airbag device. This can reduce the weight and cost of the airbag device.

In the above configuration, preferably, the at least one airbag device includes multiple airbag devices (60) each having an airbag (61) configured to be deployed from a periphery of the table toward the corresponding seat.

According to this configuration, the airbag device can protect the passengers seated on the seats more reliably.

In the above configuration, preferably, wherein the seats consist of two pairs of left and right seats (50), one pair being provided in front of the table and the other pair being provided behind the table.

According to this configuration, it is possible to efficiently arrange the four seats and the table in the cabin.

According to the foregoing configuration, it is possible to provide a vehicle that can provide a comfortable space for a wide range of passengers.

DESCRIPTION OF THE PREFERRED EMBODIMENT(S)

Preferred embodiments of a vehicle according to the present invention are described in the following with reference to the appended drawings.

Figure 1:
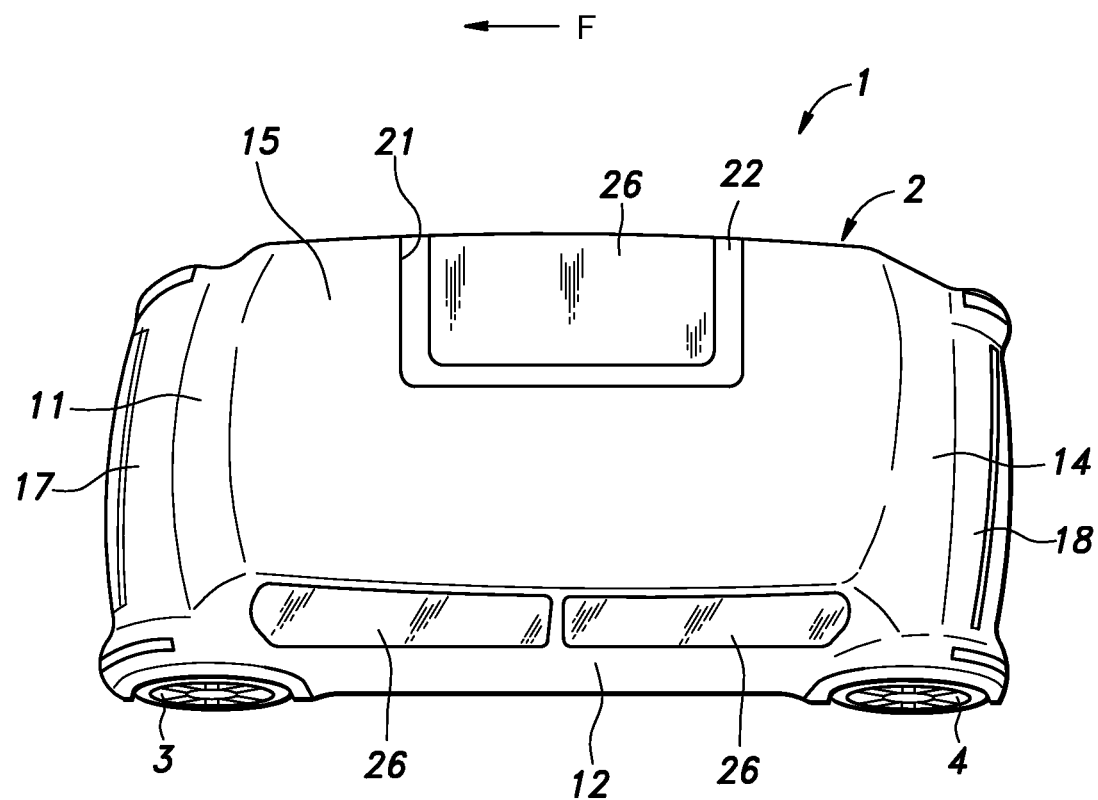
FIG. 1 is a perspective view of a vehicle according to a first embodiment of the present invention as viewed from an upper left direction.
Figure 2:
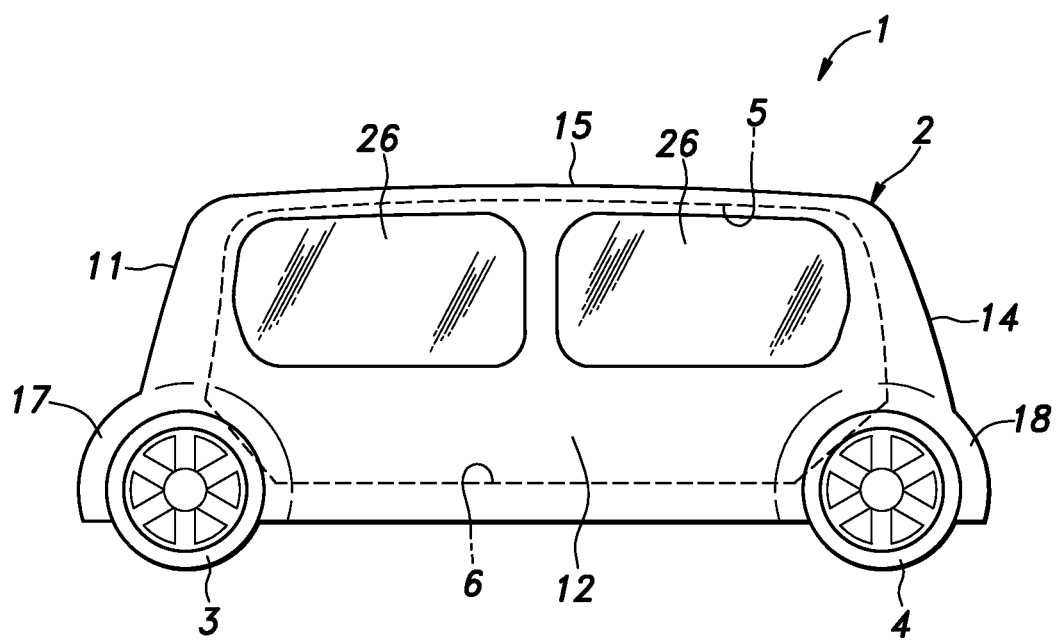
FIG. 2 is a left side view of the vehicle.
Figure 3:
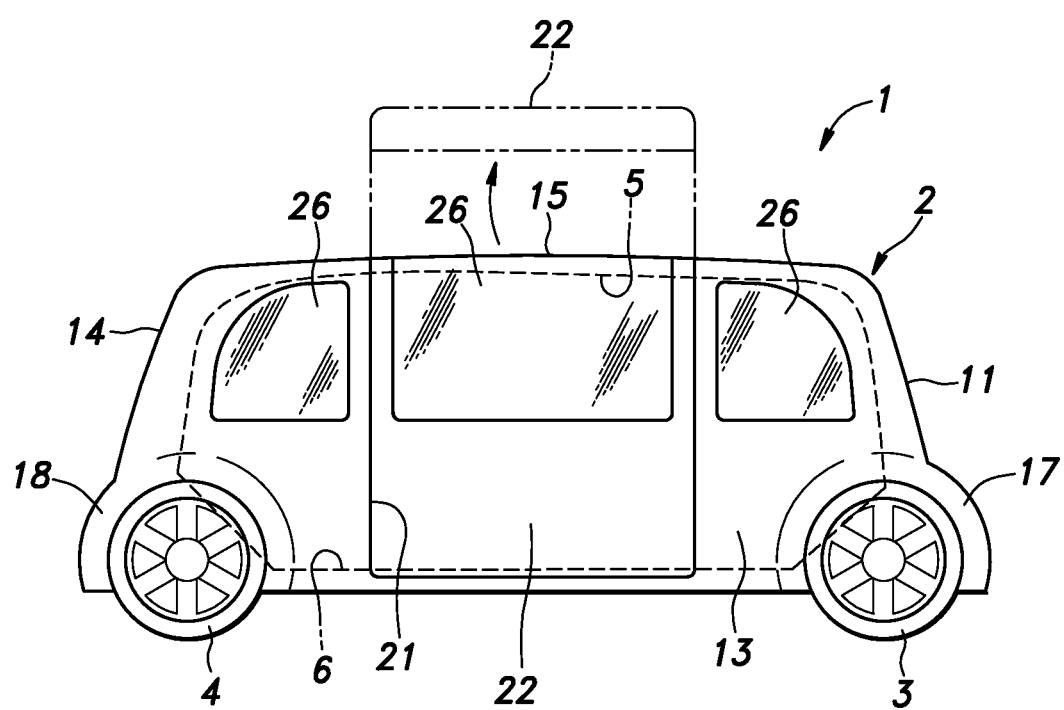
FIG. 3 is a right side view of the vehicle.

As shown in FIGS. 1 to 3, a vehicle 1 according to a first embodiment of the present invention consists of a four-wheeled vehicle. The vehicle 1 has a substantially rectangular vehicle body 2 elongated in the fore and aft direction. The vehicle body 2 is provided with a pair of front wheels 3 and a pair of rear wheels 4. The vehicle 1 may consist of an autonomous vehicle that does not require a driver.

As shown in FIGS. 1 to 4, a central part of the vehicle body 2 defines a substantially rectangular cabin 5 which is elongated in the fore and aft direction. The cabin 5 is defined by a floor 6, a front wall 11 extending laterally and vertically along a front edge of the floor 6, a left wall 12 extending rearward from the left edge of the front wall 11, a right wall 13 extending rearward from the right edge of the front wall 11, a rear wall 14 extending between the rear edges of the left wall 12 and the right wall 13, and a roof 15 connected to the upper edges of the front wall 11, the left wall 12, the right wall 13 and the rear wall 14.

A drive source such as an electric motor and an internal combustion engine, and a control unit such as an ECU are mounted either in a front part 17 of the vehicle body 2 located ahead of the front wall 11 or in a rear part 18 of the vehicle body 2 located behind the rear wall 14. The remaining available space in the vehicle front part 17 and the vehicle rear part 18 may be used as a luggage stowage space.

The right wall 13 is provided with a door opening 21 which is fitted with a door 22 for selectively closing the door opening 21. The door opening 21 extends from the lower end of the right wall 13 to a middle part of the roof 15. The door 22 in this embodiment consists of a gull-wing door, and is supported by the roof 15 at an upper end so as to be rotatable about a rotational axis extending in the fore and aft direction. Alternatively, the door 22 may consist of a regular swing door or a slide door. Windows 26 each fitted with a glass pane are provided in the remaining parts of the right wall 13 located ahead of and behind the door 22, in an upper part of the door 22, and in a large part of the left wall 12. For example, the vehicle 1 can be used as a means of transportation in a shopping mall, between terminals of an airport, or between a terminal and an airplane at an airport.

Figure 4:
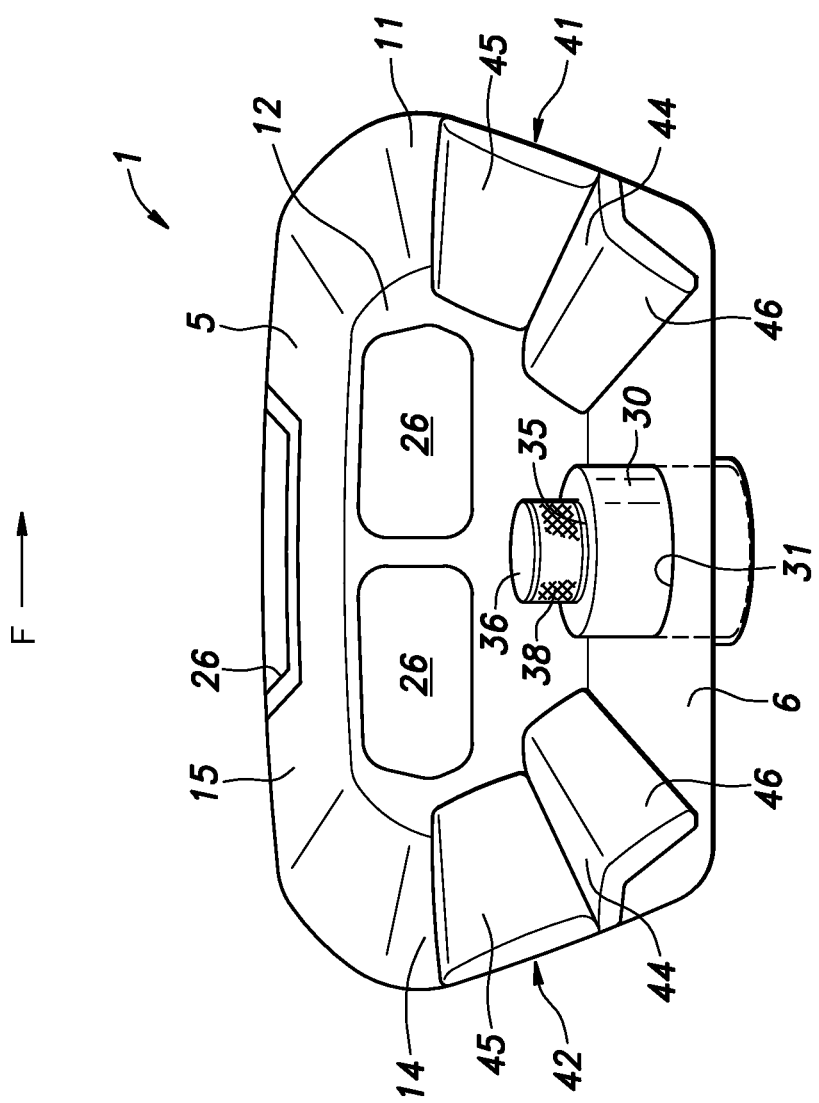
FIG. 4 is a one-point perspective view showing a cabin as viewed from the right, in which a table and an object are deployed.

As shown in FIG. 4, a table 30 is liftably provided at a center of the floor 6 of the cabin 5. The table 30 has a cylindrical shape, and is mounted to the floor 6 such that an axis thereof extends vertically. An upper surface provided at an upper end of the table 30 is formed to be flat and faces upward.

Figure 5:
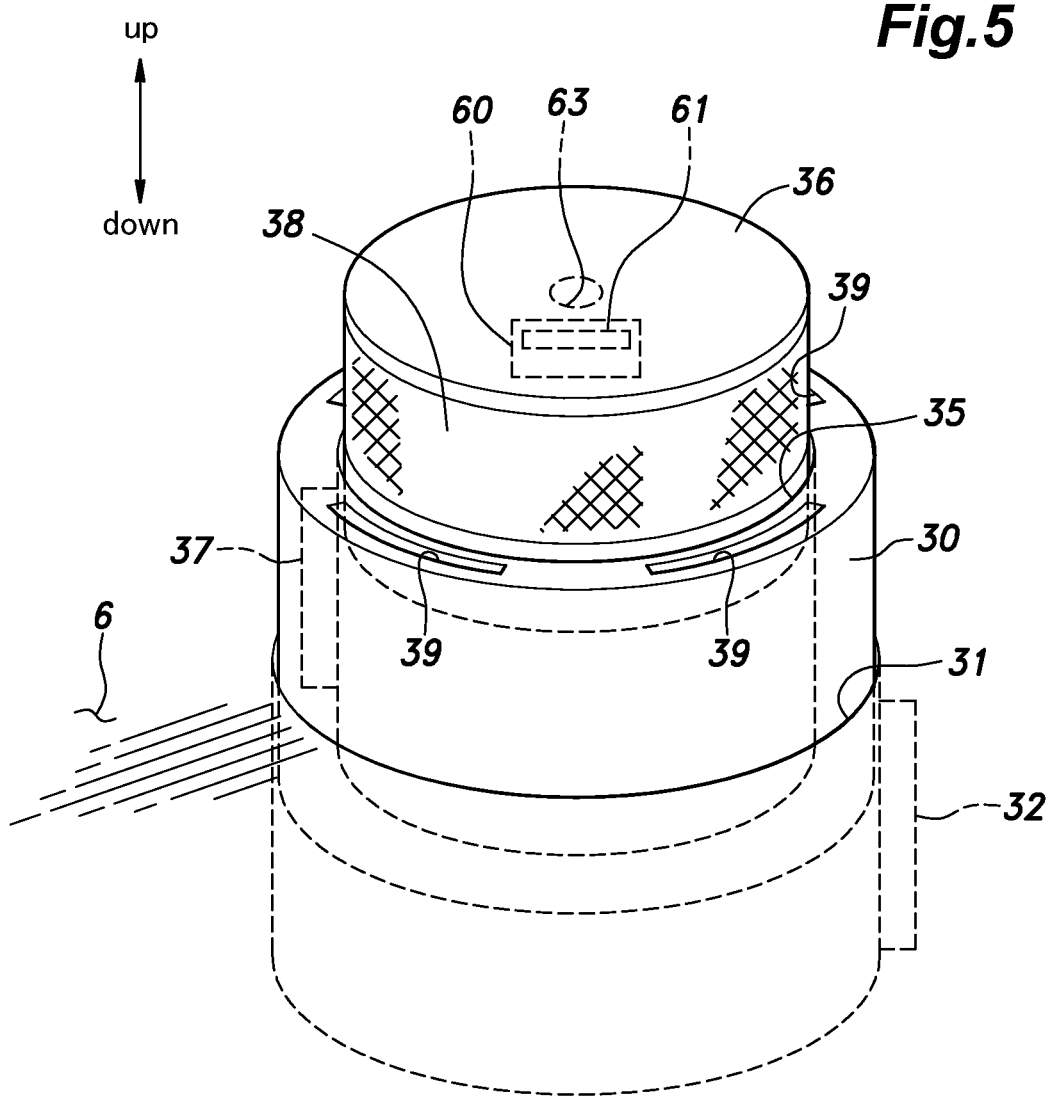
FIG. 5 is a perspective view showing the table and the object.

As shown in FIGS. 4 and 5, the floor 6 is formed with a first accommodation hole 31 for accommodating the table 30. The first accommodation hole 31 is a bottomed wall opening in an upper surface of the floor 6, and extends vertically to have a circular cross section. The floor 6 is made of a panel member, which is provided with a downward bulging part such that the first accommodation hole 31 is defined on the back side of the downward bulging part. Preferably, a battery is disposed under the floor 6 around the first accommodation hole 31.

The table 30 is accommodated in the first accommodation hole 31 so as to be movable in the vertical direction. Between the first accommodation hole 31 and the table 30 is provided a first lifting device 32 for moving the table 30 in the vertical direction relative to the first accommodation hole 31. The first lifting device 32 preferably includes an electric motor and a rack and pinion mechanism driven by the electric motor, for example.

Owing to the first lifting device 32, the table 30 can be lifted up and down between a stowed position in which at least part of the table 30 is stowed in the first accommodation hole 31 (or in the floor 6) and a deployed position in which the table 30 protrudes more upward than in the stowed position. Preferably, the table 30 is configured such that the upper surface of the table 30 in the stowed position is positioned at the same height as the upper surface of the floor 6.

The upper surface of the table 30 is formed with a second accommodation hole 35 that opens upward. An object 36 is received in the second accommodation hole 35 so as to be movable in the vertical direction. Namely, the object 36 is liftably mounted to the table 30. The second accommodation hole 35 and the object 36 each have a circular cross section, and are disposed coaxially with the table 30. Between the second accommodation hole 35 and the object 36, a second lifting device 37 is provided to move the object 36 in the vertical direction relative to the second accommodation hole 35. The second lifting device 37 may have the same configuration as the first lifting device 32.

Owing to the second lifting device 37, the object 36 can be lifted up and down between a stowed position in which the object 36 is stowed in the table 30 and a deployed position in which the object 36 protrudes upward from the upper surface of the table 30. In the illustrated embodiment, the object 36 is a monitor having a display unit 38 on an outer peripheral surface thereof. The display unit 38 may be a liquid crystal display or an organic electroluminescent (EL) display. The display unit 38 is preferably formed to extend along the outer peripheral surface of the object 36 in a hollow cylindrical shape. The display unit 38 may be used to display videos and pictures for passengers' relaxation, advertisements, etc., for example. The videos and pictures expected to provide relaxing effects include those of natural landscapes, such as mountains and seas, plants, fireplaces, etc., for example. The videos and pictures may also include news, sports broadcasts, movies, etc.

The upper surface of the table 30 may be formed with one or more air discharge ports 39 of an air conditioner (not shown). Preferably, multiple discharge ports 39 are provided around the second accommodation hole 35, as shown in FIG. 5. Alternatively or in addition, a discharge port 39 may be formed as a gap between the second accommodation hole 35 and the object 36. The discharge ports 39 may be provided in the object 36. The air conditioner may be controlled to vary the amount and temperature of the air discharged from the discharge ports 39 in accordance with the videos and pictures displayed on the display unit 38. For example, when the display unit 38 of the object 36 is displaying a video of a fireplace, the air conditioner may be controlled to discharge warm air from the discharge ports 39.

As shown in FIG. 4, multiple seats 41, 42 are arranged around the table 30 such that the seats 41, 42 face the table 30. In the illustrated embodiment, a front bench seat 41 is disposed in a front part of the cabin 5 (in front of the table 30) such that the front bench seat 41 faces rearward (toward the table 30). Further, a rear bench seat 42 is disposed in a rear part of the cabin 5 (behind the table 30) such that the rear bench seat 42 faces forward (toward the table 30). The front bench seat 41 and the rear bench seat 42 are each designed such that multiple people can sit thereon. In this embodiment, two people can sit on each of the front bench seat 41 and the rear bench seat 42. Each of the front bench seat 41 and the rear bench seat 42 has a seat cushion 44 mounted on the floor 6 and a seat back 45 extending upward from the rear end of the seat cushion 44. The seat back 45 may be connected to the seat cushion 44 so as to be tiltable rearward. Further, an ottoman 46 may be provided to extend downward from the front end of the seat cushion 44. The ottoman 46 is preferably connected to the seat cushion 44 so as to be tiltable forward.

Figure 6:
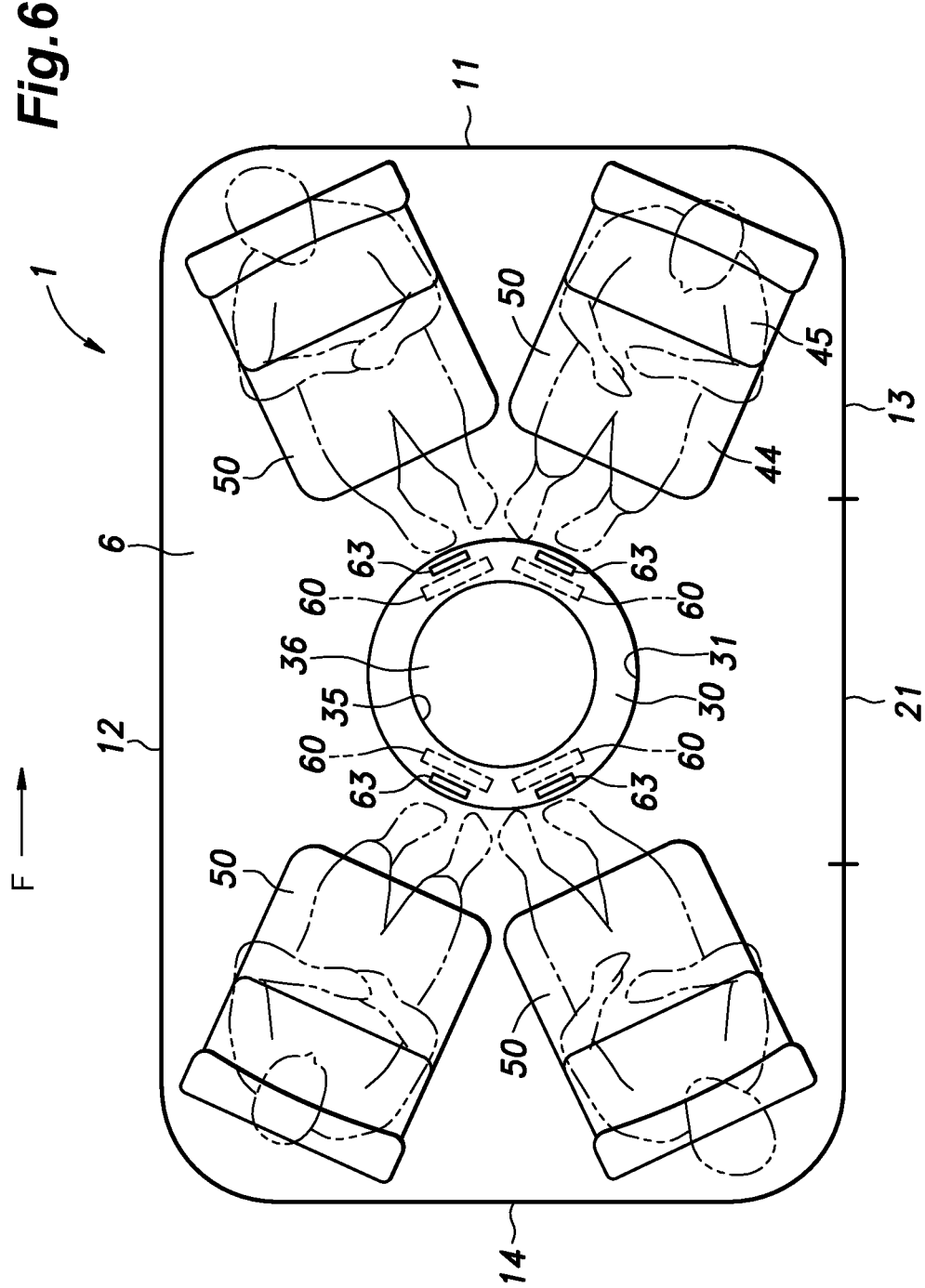
FIG. 6 is a plan view showing a cabin according to a second embodiment.

In a second embodiment, as shown in FIG. 6, multiple (four) seats 50 each for one person may be provided such that two of them are arranged laterally side by side in the front part of the cabin 5 (in front of the table 30) and the remaining two are arranged laterally side by side in the rear part of the cabin 5 (behind the table 30). Each seat 50 is preferably disposed to face toward the center of the table 30. In yet another embodiment, six seats 50 each for one person may be provided such that three of them are disposed in the front part of the cabin 5 and the remaining three are disposed in the rear part of the cabin 5.

One or more airbag devices 60 are provided in at least one of the table 30 and the object 36. Each airbag device 60 includes an airbag 61 and an inflator (not shown) for sending air to the airbag 61 to inflate the same. In the first embodiment, a single airbag device 60 having a single airbag 61 is disposed inside the object 36. An upper surface of the object 36 is provided with a deployment opening 63 of the airbag 61. The deployment opening 63 is an opening that is to be ruptured by the pressure caused by inflation of the airbag 61, and is usually closed. When deployed, the airbag 61 ruptures the deployment opening 63 and passes the deployment opening 63 to inflate upward. Thereafter, the airbag 61 inflates upward and toward all of the seats 41, 42, to fill the space in the cabin 5 above the table 30. Thereby, collision or contact between the table 30 and each passenger seated on the seats 41, 42 as well as between the passengers can be prevented in the event of a vehicle crash, for example.

In a modification, the object 36 may be omitted and the table 30 may not be formed with the second accommodation hole 35 for stowing the object 36 therein. In such a case, the airbag device 60 may be disposed inside the table 30, and the deployment opening 63 may be formed in the upper surface of the table 30. In this case, the deployment opening 63 is preferably provided at a position close to the center of the table 30.

As shown in FIG. 6, in the second embodiment, multiple (four) airbag devices 60 are provided in the table 30 corresponding to the respective seats 50. In this embodiment, the deployment openings 63 corresponding to the respective airbag devices 60 are provided in an outer peripheral portion of the upper surface of the table 30 at positions opposing the respective seats 50. The airbag 61 of each airbag device 60 is provided such that the airbag 61 can be deployed from an outer peripheral part of the table 30 through the corresponding deployment opening 63 toward the corresponding seat 50.

Figure 7:
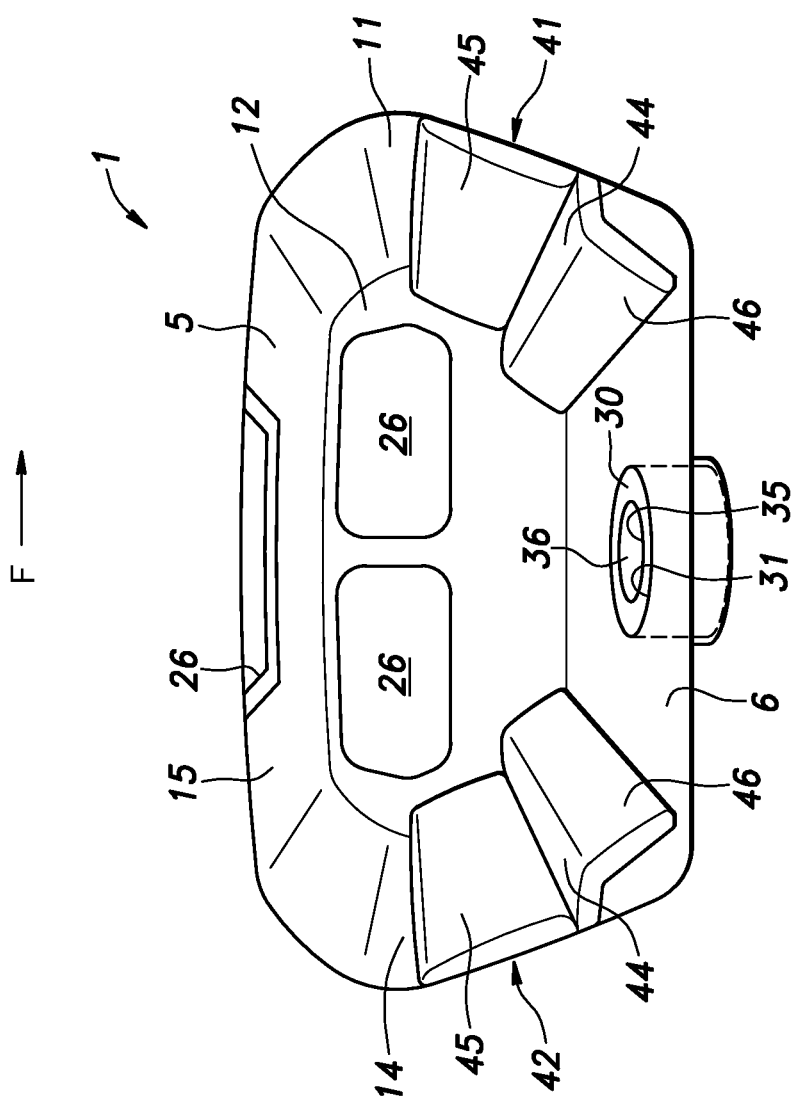
FIG. 7 is a one-point perspective view showing the cabin as viewed from the right, in which the table and the object are stowed.
Figure 8:
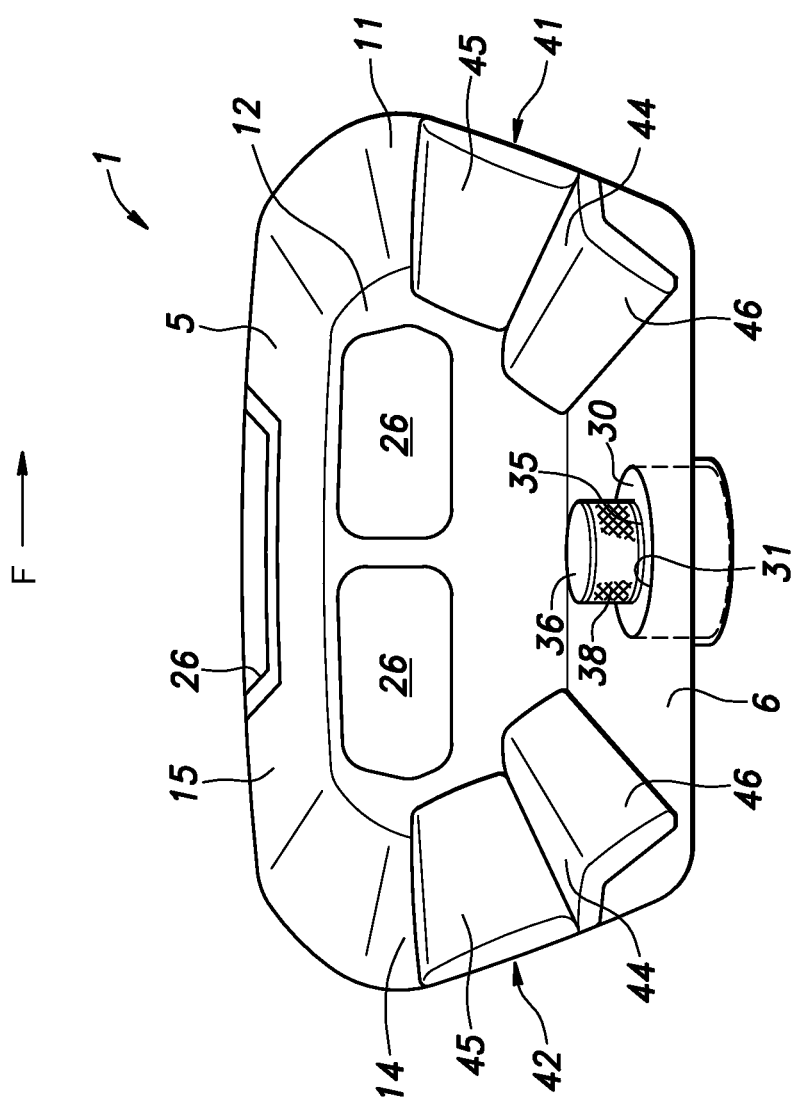
FIG. 8 is a one-point perspective view showing the cabin as viewed from the right, in which the table is stowed while the object is deployed.

Operations and advantages of the vehicle 1 configured as described in the foregoing will now be explained. Passengers can enter the cabin 5 through the door opening 21 provided in the right wall 13 of the vehicle 1. As shown in FIG. 7, when the passengers get in or out of the vehicle 1, the table 30 is placed in the stowed position and the object 36 is placed in the stowed position, such that a moving space for the passengers is formed in the middle of the cabin 5 to thereby allow the passengers to get in or out of the vehicle 1 easily. As shown in FIG. 8, it is also possible to place the table 30 in the stowed position while placing the object 36 in the deployed position. In this case, though the moving space for the passengers becomes somewhat smaller, the object 36 can be continuously used while the passengers are getting in or out of the vehicle 1. Also, at night, the display unit 38 of the object 36 can be used as a light to illuminate the foot area.

As shown in FIG. 7, when the table 30 is in the stowed position, the upper surface of the table 30 is at the same height as the upper surface of the floor 6 (or the upper surface of the table 30 is flush with the upper surface of the floor 6), and therefore, there is no step created between the table 30 and the floor 6. Further, when the object 36 is in the stowed position, the upper surface of the object 36 is at the same height as the upper surface of the table 30, and therefore, there is no step created between the object 36 and the table 30. These contribute to allowing the passengers to get in or out of the vehicle 1 easily.

When the table 30 is in the deployed position, the passengers can place an article, such as a smartphone and a bag, on the table 30. Further, the table 30 functions as a partition wall separating the passengers who face each other in the fore and aft direction from each other, so that an appropriate distance is maintained between the passengers. This can contribute to securing privacy of each passenger and minimizing stress even when the passengers are strangers to one another.

When the object 36 protrudes upward from the table 30, the table 30 and the object 36 can more effectively separate the passengers from each other. The object 36 blocks the line of sight of the passengers seated to face each other across the table 30 to thereby contribute to securing privacy of each passenger and reducing stress of each passenger.

In addition, the videos and pictures displayed on the display unit 38 of the object 36 are expected to relax the passengers and facilitate conversation between the passengers.

The table 30 and the object 36 may be configured to be lifted up and down in response to a passenger's operation of a switch provided in the cabin 5. Alternatively or in addition, the table 30 and the object 36 may be lifted up and down automatically by a controller in accordance with an operating state of the vehicle 1. For instance, the table 30 and the object 36 may be controlled to move to the respective stowed positions when the door 22 is moved to the open position.

In the foregoing, the present invention has been described in terms of preferred embodiments thereof, but the present invention is not limited to these embodiments, and may be modified appropriately within the scope of the present invention. For instance, the vehicle 1 may not be an autonomous vehicle. In such a case, a driver's cabin in which a driver sits may be provided at the vehicle front part 17. Alternatively, the driver's seat may be provided in a front part of the cabin 5. In this case, it is preferred to provide a window in the front wall 11 so that the driver and/or passengers can see ahead of the cabin 5.

The shape of the table 30 and the object 36 is not limited to a cylindrical shape, and they may have any polygonal prism shape such as a rectangular prism shape. Further, a hollow-cylindrical display unit (monitor) may be provided on an outer periphery of the table 30.

Further, it may be possible to omit the display unit 38 from the object 36 and to use the object 36 simply as a partition (blind).

The invention claimed is:
1. A vehicle, comprising:
a table liftably provided at a center of a floor of a cabin of the vehicle;
a first accommodation hole formed on the floor for accommodating the table, a first lifting device provided between the first accommodation hole and the table for moving the table in the vertical direction relative to the first accommodation hole, an object liftably mounted to an upper part of the table, a second accommodation hole formed on an upper surface of the table for accommodating the object, a second lifting device provided between the second accommodation hole and the object for moving the object in the vertical direction relative to the second accommodation hole, and multiple seats arranged around the table such that each seat faces the table.

2. The vehicle according to claim 1, wherein the table is configured to be lifted up and down between a stowed position in which at least a part of the table is stowed in the floor and a deployed position in which the table protrudes more upward than in the stowed position.

3. The vehicle according to claim 2, wherein an upper surface of the table in the stowed position is positioned at a same height as an upper surface of the floor.

4. The vehicle according to claim 1, further comprising an airbag device provided in at least one of the table and the object, the airbag device including an airbag configured to be deployed toward all of the seats.

5. The vehicle according to claim 1, further comprising at least one airbag device provided in at least one of the table and the object, the at least one airbag device including at least one airbag.

6. The vehicle according to claim 5, wherein the at least one airbag device consists of a single airbag device having a single airbag configured to be deployed upward and toward all of the seats from a center of the table or the object.

7. The vehicle according to claim 5, wherein the at least one airbag device includes multiple airbag devices each having an airbag configured to be deployed from a periphery of the table toward the corresponding seat.

8. The vehicle according to claim 1, wherein the seats consist of two pairs of left and right seats, one pair being provided in front of the table and the other pair being provided behind the table.

9. The vehicle according to claim 1, wherein the table is placeable in a stowed position in which at least a part of the table is stowed in the floor while placing the object in a deployed position in which the object protrudes upward from the upper surface of the table.

10. A vehicle, comprising:

a table liftably provided at a center of a floor of a cabin of the vehicle;

multiple seats arranged around the table such that each seat faces the table, and at least one airbag device provided in the table, the at least one airbag device including at least one airbag, wherein the at least one airbag device includes multiple airbag devices each having an airbag configured to be deployed from a periphery of the table toward the corresponding seat.

* * * * *